3,086,968
FLUORINATED AZO DYES
George N. Valakanas and Heinrich Hopff, Zurich, Switzerland, assignors to Stauffer Chemical Company, a corporation of Delaware
No Drawing. Filed May 16, 1961, Ser. No. 110,330
6 Claims. (Cl. 260—193)

This invention relates in general to a process for the preparation of fluorine-containing azoic dyestuffs.

It is an object of this invention to provide new fluorine-containing azoic dyestuffs.

It is a further object of this invention to provide a method for the preparation of pigments which are of high brightness.

Other objects and advantages of this invention, if not specifically set forth, will become apparent during the course of the description which follows.

Generally, the compounds of this invention may be prepared by reacting an acetoacetofluoroanilide with a diazonium salt of a diazotized aniline.

More particularly, in the practice of this invention, an acetoacetanilide of the general formula

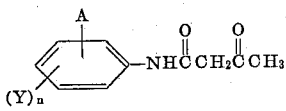

where Y is —H or —CH₃, n is 1 or 2 and A is —H or —F is prepared and reacted with a diazonium salt of a diazotized aniline material of the formula

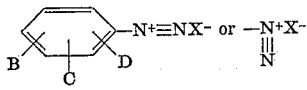

where B, C and D are —H, —CH₃, —OCH₃, —NO₂ or —F and X is —Cl or —Br. At least one of the substituents A, B, C and D represents —F. Conveniently, the diazonium compound is added as the salt, e.g. or any of the other well-known salt forms. The resulting products have the formula

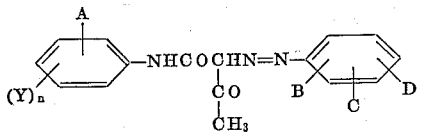

The resulting dyes are of a green shade and possess high brightness.

The acetoacetanilides used as precursors can be prepared by the method of Fierz and Ziegler, Helv. Chim. Acta II, 782, wherein there is disclosed the reaction of an acetoacetic alkyl ester with aniline or a derivative thereof having various groups substituted on the benzene ring. The process can be improved slightly by the addition of a few drops of pyridine to the reaction mixture.

Examples are set forth below for illustrative purposes; these are not to be interpreted as imposing limitations on the scope of the invention other than is set forth in the appended claims.

Example 1.—Preparation of (2-Nitro, 4-Methyl Benzolazo) Acetoacetic Acid (3-Methyl, 4-Fluoroanilide)

The compound 3-methyl, 4-fluoro acetoacetanilide was prepared in a 250 cc. round-bottom flask equipped with a condenser arranged for distillation. Through a separatory funnel was introduced 18.2 g. freshly distilled acetoacetic ethyl ester, 30 cc. of xylene, and 2–3 drops of pyridine. The contents of the flask were heated to 135–140° C. To this solution was added, drop-wise, 15 g. 2-fluoro, 5-aminotoluene in 30 cc. of xylene with 5 additional drops of pyridine over a period of 5 hours in such a manner that the addition rate equaled the rate at which the solvent was distilled off. Thereafter, heating was continued for an additional two hours and additional solvent distilled off. A bright red solution was obtained which was cooled to precipitate 3-methyl, 4-fluoroacetoacetanilide. The solution was filtered and the filter cake washed with petroleum ether. The product, a fine white crystalline material, was recrystallized from xylene; M.P. 86–87° C. A quantity of 7 g. of the 3-methyl, 4-fluoroacetoacetanilide was dissolved in 100 cc. of glacial acetic acid and to this at 0° under stirring was added drop-wise over a 2-hour period 30 cc. of a diazonium salt (hydrochloride) solution of diazotized 3-nitro, 4-aminotoluene, the solution having been prepared from 6 g. of the free base. The reddish-yellow precipitate, the compound (2-nitro, 4-methyl benzolazo) acetoacetic acid (3-methyl, 4-fluoroanilide) was formed gradually. This was stirred for six hours at room temperature, plus an additional 12 hours in a cold room (about —5°–0° C.). Following filtration, the reddish precipitate was recrystallized from acetic acid. A golden-reddish crystalline compound was obtained which, in a 10% solution of acetic acid, dyed with a strong greenish-yellow color. Yield: 7.2 g.; 57.2% theoretical; M.P. 167–8° C.

Example 2.—Preparation of (2-Methyl, 5-Fluoro Benzolazo) Acetoacetic Acid (2-Methyl, 5-Fluoroanilide)

A quantity of 10.5 g. of 2-methyl, 5-fluoroacetoacetanilide (M.P. 86–7° C.) prepared as was the 3-methyl, 4-fluoroacetoacetanilide of Example 1 was added to the diazonium salt solution of the diazotized 2-methyl, 5-fluoroaniline to yield a reddish colored precipitate which was recrystallized from acetic acid. A greenish-yellow colored crystalline compound was obtained which, in a 10% solution of acetic acid, dyed with a yellow color with green shade color. Yield: 13.5 g.; 80.5% theoretical; M.P. 179–180° C.

Example 3.—Preparation of (3-Fluoro Benzolazo) Acetoacetic Acid (2-Methyl, 5-Fluoroanilide)

A quantity of 10 g. of 2-methyl, 5-fluoroacetoacetanilide was dissolved in 100 cc. of glacial acetic acid and reacted with the diazonium salt solution of diazotized m-fluoroaniline (6.0 g. of free base) to yield a yellow crystalline compound (recrystallized from acetic acid). A 10% solution in acetic acid dyed with a yellow color. Yield: 11.8 g.; 75% theoretical; M.P. 183–184° C.

Example 4.—Preparation of (3-Methyl, 4-Fluoro Benzolazo) Acetoacetic Acid (3-Methyl, 4-Fluoroanilide)

In the same fashion as set forth in Example 1 above, 10 g. of 3-methyl, 4-fluoroacetoacetanilide were dissolved in 100 cc. of glacial acetic acid and reacted with the diazonium salt solution of diazotized m-methyl, 4-fluoroaniline (prepared from 6.5 g. of the free base) to give a yellow crystalline compound (recrystallized from acetic acid). A 10% solution of acetic acid dyed with a yellow color. Yield: 12.8 g.; 80% theoretical; M.P. 148–150° C.

Example 5.—Preparation of (3-Methyl, 4-Fluoro Benzolazo) Acetoacetic Acid (3-Fluoroanilide)

In the fashion set forth above, 10 g. of 2-methyl, 5-fluoroacetoacetanilide were dissolved in 100 cc. glacial acetic acid and reacted with the diazonium salt solution of diazotized 3-methyl, 4-fluoroaniline (prepared from 6.5 g. of free base) to yield a greenish-yellow crystalline compound (recrystallized from acetic acid) which, when in a 10% acetic acid solution, dyed with a greenish-yellow color. Yield: 10.6 g.; 66.3% theoretical; M.P. 195–196° C.

*Example 6.—Preparation of (3-Fluoro, 4-Methyl Benzolazo) Acetoacetic Acid (3-Methyl, 4-Fluoroanilide)*

In the manner set forth above, 10 g. of 3-methyl, 4-fluoroacetoacetanilide were dissolved in 100 cc. of glacial acetic acid and reacted with the diazonium salt solution of diazotized 3-fluoro, 4-methyl aniline (6.5 cc. of free base) to yield a yellow crystalline compound (recrystallized from acetic acid) which, when in a 10% acetic acid solution, dyed with a yellow color. Yield: 11.2 g.; 70% theoretical; M.P. 158–159° C.

*Example 7.—Preparation of (3-Fluoro, 4-Methyl Benzolazo) Acetoacetic Acid (3-Fluoroanilide)*

In the manner described above, 10 g. of 3-fluoroacetoacetanilide (M.P. 92–3° C.) were dissolved in 100 cc. glacial acetic acid and reacted with the diazonium salt solution of diazotized 3-fluoro, 4-methyl aniline (prepared from 7 g. of free base) to yield a yellow crystalline compound (recrystallized from acetic acid). A 10% solution of acetic acid dyed with a yellow color. Yield: 11.5 g.; 70% theoretical; M.P. 218–219° C.

*Example 8.—Preparation of (2-Methyl, 4-Nitro Benzolazo) Acetoacetic Acid (3-Fluoroanilide)*

In the fashion described in Example 1 above, 10 g. of 3-fluoroacetoacetanilide were dissolved in 100 cc. glacial acetic acid and reacted with the diazonium salt solution of diazotized 2-methyl, 4-nitroaniline (prepared from 8 g. of free base) to yield a reddish-yellow crystalline compound (recrystallized from acetic acid). A 10% solution of acetic acid dyed with a reddish-yellow color. Yield: 14.9 g.; 83.5% theoretical; M.P. 237–238° C.

*Example 9.—Preparation of (2-Methyl, 4-Nitro Benzolazo) Acetoacetic Acid (3-Fluoro, 4-Methyl Anilide)*

10 g. of 3-fluoro, 4-methylacetoacetaniline (M.P. 103–104° C.) were dissolved in 100 cc. of glacial acetic acid and reacted with the diazonium salt solution of diazotized 2-methyl, 4-nitroaniline (prepared from 8 g. of free base) to yield a reddish-yellow crystalline compound (recrystallized from acetic acid). In a 10% acetic acid solution, it dyed with a yellow color. Yield: 13.3 g.; 74.8% theoretical; M.P. 208–209° C.

*Examle 10.—Preparation of (2-Methyl, 4-Nitro Benzolazo) Acetoacetic Acid (p-Toluidide)*

A quantity of 10 g. of 4-methylacetoacetanilide (M.P. 94–5° C.) was dissolved in 100 cc. of glacial acetic acid and reacted with the diazonium salt solution of diazotized 2-methyl, 4-nitroaniline (prepared from 8.5 g. of free base) to yield a red-yellow crystalline compound (recrystallized from acetic acid). In a 10% solution of glacial acetic acid, it dyed with a reddish-yellow color. Yield: 14.2 g.; 79.0% theoretical.

*Example 11.—Preparation of (2-Methoxy, 4-Nitro Benzolazo) Acetoacetic Acid (3-Methyl, 4-Fluoroanilide)*

A quantity of 10 g. of 3-methyl, 4-fluoroacetoacetanilide was dissolved in 100 cc. of glacial acetic acid and reacted with the diazonium salt solution of diazotized 2-amino, 5-nitroanisole (prepared from 8.5 g. of free base) to yield a green-yellow crystalline compound (recrystallized from acetic acid). When in a 10% solution of glacial acetic acid, the product dyed with a greenish-yellow color. Yield: 11.2 g.; 62.3% theoretical; M.P. 210–211° C.

*Example 12.—Preparation of (2-Nitro, 4-Fluoro Benzolazo) Acetoacetic Acid (2,4-Dimethyl, 6-Fluoroanilide)*

An additional run was made with 2,4-dimethyl, 6-fluoroacetoacetanilide (M.P. 160–161° C.) and 2-nitro, 4-fluoroaniline to yield (2-nitro, 4-fluoro benzolazo) acetoacetic acid (2,4-dimethyl, 6-fluoroanilide) in a quantity of 9.8 g.; 57.7% theoretical; M.P. 199–201° C.

The foregoing runs permitted qualitative study of the effect to fluorine on "Hansa-Gelb" azo dyes. There was observed a red to green shift as follows:

$$10<8<7<4<9<5<11<1<2$$

wherein the numbers refer to the products of the examples set forth above.

It has been found that the fluorine-containing azoic dyes prepared in accordance with the process set forth above display superior light fastness. For example, certain of them exhibit 20% greater light fastness than the corresponding "Hansa-Gelb" type dyes which have been used heretofore.

Obviously many modifications and variations of the invention as hereinbefore set forth may be made without departing from the spirit and scope thereof, and therefore only such limitations should be imposed as are indicated in the appending claims.

We claim:

1. Compounds of the general formula:

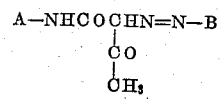

where: A is selected from the class consisting of 3-methyl, 4-fluorophenyl; 2-methyl, 5-fluorophenyl; 3-fluorophenyl; 3-fluoro, 4-methylphenyl; 4-methylphenyl and 2,4-dimethyl, 6-fluorophenyl and B is selected from the class consisting of 2-nitro, 4-methylphenyl; 2-methyl, 5-fluorophenyl; 3-fluorophenyl; 3-methyl, 4-fluorophenyl; 3-fluoro, 4-methylphenyl; 2-methyl, 4-nitrophenyl; 2-methoxy, 4-nitrophenyl; and 2-nitro, 4-fluorophenyl, where at least one of A and B contains a fluoro group.

2. The compound

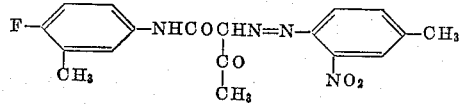

3. The compound

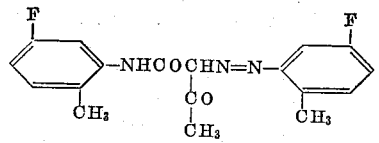

4. The compound

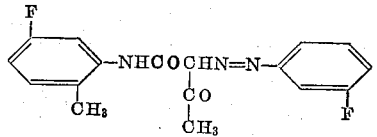

5. The compound

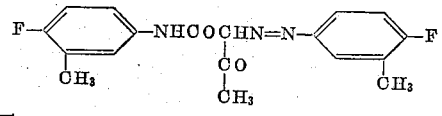

6. The compound

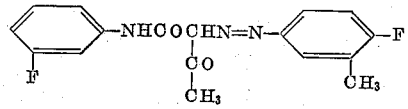

References Cited in the file of this patent
UNITED STATES PATENTS 2,112,764    Dahlen et al. _____ Mar. 29, 1938